(12) United States Patent
Narula et al.

(10) Patent No.: US 12,235,777 B2
(45) Date of Patent: Feb. 25, 2025

(54) MANAGING PERIPHERAL DEVICE CONNECTIVITY BASED ON CONTEXT

(71) Applicant: Dell Products, L.P., Round Rock, TX (US)

(72) Inventors: Harpreet Narula, Austin, TX (US); Kameel Vohra, Singapore (SG); Vincent Tucker, Dublin, CA (US)

(73) Assignee: Dell Products, L.P., Round Rock, TX (US)

( * ) Notice: Subject to any disclaimer, the term of this patent is extended or adjusted under 35 U.S.C. 154(b) by 12 days.

(21) Appl. No.: 17/811,389

(22) Filed: Jul. 8, 2022

(65) Prior Publication Data

US 2024/0012766 A1    Jan. 11, 2024

(51) Int. Cl.
| | | |
|---|---|---|
| *G06F 13/12* | (2006.01) | |
| *A63F 13/235* | (2014.01) | |
| *G06F 1/32* | (2019.01) | |
| *G06F 1/3212* | (2019.01) | |
| *G06F 13/38* | (2006.01) | |
| *H04L 69/18* | (2022.01) | |
| *H04W 4/80* | (2018.01) | |

(52) U.S. Cl.
CPC ............ *G06F 13/12* (2013.01); *A63F 13/235* (2014.09); *G06F 1/3212* (2013.01); *G06F 13/382* (2013.01); *H04L 69/18* (2013.01); *H04W 4/80* (2018.02)

(58) Field of Classification Search
None
See application file for complete search history.

(56) References Cited

U.S. PATENT DOCUMENTS

| | | | | |
|---|---|---|---|---|
| 7,024,501 | B1* | 4/2006 | Wright | .................. G06F 13/385 |
| | | | | 710/36 |
| 7,032,045 | B2* | 4/2006 | Kostadinov | ............... H04L 9/40 |
| | | | | 710/72 |
| 8,441,932 | B2* | 5/2013 | Zorba Barah | ....... H04W 72/543 |
| | | | | 370/235 |
| 8,446,862 | B2* | 5/2013 | Yokota | .............. H04W 52/0264 |
| | | | | 370/328 |
| 9,819,424 | B2* | 11/2017 | Balasubramanian | .. H04B 15/02 |
| | | | (Continued) | |

FOREIGN PATENT DOCUMENTS

| | | | | |
|---|---|---|---|---|
| GB | | 2579664 A | * 7/2020 | ........... H04R 25/554 |
| WO | WO-2014201177 A1 | * 12/2014 | ......... H04L 43/0882 |

OTHER PUBLICATIONS

Machine Translation of JP 2013192010 A, 2013. (Year: 2013).*
(Continued)

*Primary Examiner* — Steven G Snyder
(74) *Attorney, Agent, or Firm* — Fogarty LLP

(57) ABSTRACT

Systems and methods for managing peripheral device connectivity based on context are described. In an embodiment, an IHS may include a processor and a memory coupled to the processor, the memory having program instructions stored thereon that, upon execution, cause the IHS to: select a first radio to communicate with a peripheral device; determine that at least one of: a distance between the IHS and the peripheral device, a battery level of the IHS, or a battery level of the peripheral device is greater or smaller than a threshold value; and, in response to the determination, select a second radio to communicate with the peripheral device.

19 Claims, 3 Drawing Sheets

(56) References Cited

U.S. PATENT DOCUMENTS

| | | | |
|---|---|---|---|
| 10,178,653 B2* | 1/2019 | Marupaduga | H04W 72/20 |
| 10,912,136 B2* | 2/2021 | Foster | G06F 3/011 |
| 11,363,533 B2* | 6/2022 | Lei | H04L 12/40039 |
| 2005/0235159 A1* | 10/2005 | Anandakumar | G06F 3/0383 |
| | | | 710/72 |
| 2005/0261038 A1* | 11/2005 | Chary | H04W 52/0261 |
| | | | 455/574 |
| 2006/0046736 A1* | 3/2006 | Pering | H04B 1/1615 |
| | | | 455/452.2 |
| 2007/0121536 A1* | 5/2007 | Aihara | H04W 48/18 |
| | | | 370/318 |
| 2008/0126585 A1* | 5/2008 | Matsumura | G06F 3/038 |
| | | | 710/8 |
| 2010/0146153 A1* | 6/2010 | Chen | G06F 1/1613 |
| | | | 710/8 |
| 2010/0268971 A1* | 10/2010 | Poo | H04W 52/0261 |
| | | | 713/320 |
| 2010/0329191 A1* | 12/2010 | Yokota | H04W 52/0264 |
| | | | 370/328 |
| 2015/0072627 A1* | 3/2015 | Balasubramanian | H04B 15/02 |
| | | | 455/77 |
| 2016/0353426 A1* | 12/2016 | Marupaduga | H04W 76/15 |
| 2017/0318098 A1* | 11/2017 | Sanghvi | H04W 84/18 |
| 2018/0206284 A1* | 7/2018 | Zhou | H04L 1/1887 |
| 2018/0359689 A1* | 12/2018 | Lee | H04W 48/16 |
| 2019/0116497 A1* | 4/2019 | Veramendi | G06F 9/4411 |
| 2019/0158413 A1* | 5/2019 | Patil | H04W 74/006 |
| 2020/0092925 A1* | 3/2020 | Foster | H04W 76/14 |
| 2020/0288361 A1* | 9/2020 | Okada | H04W 52/0212 |

OTHER PUBLICATIONS

Machine Translation of JP 2012015793 A, 2012. (Year: 2012).*
Machine Translation of CN 101778162 A, 2010. (Year: 2010).*
'Wireless Connectivity Technology Selection Guide' by Texas Instruments, 2Q 2021. (Year: 2021).*
'Bluetooth—Core Specification v 5.0' Dec. 6, 2016, Bluetooth SIG Proprietary. (Year: 2016).*
'AdaptaBLE: Adaptive control of data rate, transmission power, and connection interval in bluetooth low energy' by Park et al., Computer Networks vol. 181, Nov. 9, 2020. (Year: 2020).*
'Classic Bluetoothvs. Bluetooth Lowenergy (BLE)' by Consani, 2020. (Year: 2020).*
Machine Translation of CN 111935687 A, 2020. (Year: 2020).*
Derwent Abstract of CN 103634932 A, 2014. (Year: 2014).*

* cited by examiner

MANAGING PERIPHERAL DEVICE CONNECTIVITY BASED ON CONTEXT

FIELD

This disclosure relates generally to Information Handling Systems (IHSs), and, more specifically, to systems and methods for managing peripheral device connectivity based on context.

BACKGROUND

As the value and use of information continues to increase, individuals and businesses seek additional ways to process and store it. One option available to users is an Information Handling System (IHS). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated.

Variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

SUMMARY

Systems and methods for systems and methods for managing peripheral device connectivity based on context are described. In an illustrative, non-limiting embodiment, an IHS may include a processor and a memory coupled to the processor, the memory having program instructions stored thereon that, upon execution, cause the IHS to: select a first radio to communicate with a peripheral device; determine that at least one of: a distance between the IHS and the peripheral device, a battery level of the IHS, or a battery level of the peripheral device is greater or smaller than a threshold value; and, in response to the determination, select a second radio to communicate with the peripheral device.

For example, the IHS may include a laptop computer, a desktop computer, a tablet, or a smart phone, and the peripheral device may include a headset, a mouse, a keyboard, or a video game controller. The first and second radios may be selected from the group consisting of: a BLUETOOTH (BT) radio, a BT Low Energy (BLE) radio, and a proprietary radio frequency (RF) radio.

In some cases, the first radio may be a BT radio, the distance between the IHS and the peripheral device may be greater than the threshold value, and the second radio may be a proprietary RF radio. In other cases, the first radio may be a proprietary RF radio, the distance between the IHS and the peripheral device may be smaller than the threshold value, and the second radio may be a BT radio. In yet other cases, the first radio may be a BT radio, at least one of: the battery level of the IHS, or the battery level of the peripheral device may be greater than the threshold value, and the second radio may be a proprietary RF radio. In still other cases, the first radio may be a proprietary RF radio, at least one of: the battery level of the IHS, or the battery level of the peripheral device may be smaller than the threshold value, and the second radio may be a BT radio.

The program instructions, upon execution, may cause the IHS to verify, prior to selection of the second radio, that a selected application or type of application is being executed by the IHS, and the selection of the second radio may be based upon the verification. For instance, the type of application may include a gaming, collaboration, video conferencing, audio conferencing, or streaming application.

In some cases, to verify that the selected application is being executed by the IHS, the program instructions, upon execution, may cause the IHS to verify that the selected application is the most active application among a plurality of applications in execution. Additionally, or alternatively, to verify that the selected application is being executed by the IHS, the program instructions, upon execution, may cause the IHS to verify that the selected application is being executed in a foreground.

The program instructions, upon execution, may cause the IHS to select the first radio to communicate with the peripheral device in response to a determination that the selected application is being executed in a background. Additionally, or alternatively, the program instructions, upon execution, may also cause the IHS to verify, prior to selection of the second radio, that a selected application or type of application is not being executed by the IHS, and the selection of the second radio may be based upon the verification. Additionally, or alternatively, the program instructions, upon execution, may cause the IHS to verify, prior to selection of the second radio, that a signal strength of the first radio is predicted to be below a threshold value, and the selection of the second radio may be based upon the verification. Additionally, or alternatively, the program instructions, upon execution, may cause the IHS to verify, prior to selection of the second radio, that the IHS is in or away from a given location, and the selection of the second radio may be based upon the verification.

To determine that at least one of: the distance between the IHS and the peripheral device, the battery level of the IHS, or the battery level of the peripheral device is greater or smaller than the threshold value may include predicting that at least one of: the distance between the IHS and the peripheral device, the battery level of the IHS, or the battery level of the peripheral device is expected to be greater or smaller than the threshold value. In some implementations, the program instructions, upon execution, may cause the IHS to, in response to a manual override, select the first radio to communicate with the peripheral device.

In another illustrative, non-limiting embodiment, a method may include: determining that at least one of: a distance between an IHS and a dual-mode peripheral device, a battery level of the IHS, or a battery level of the dual-mode peripheral device is greater or smaller than a threshold value; and, in response to the determination, selecting a first radio to allow a first application executed by the IHS to communicate with the dual-mode peripheral device, and selecting a second radio to allow a second application executed by the IHS to communicate with the dual-mode peripheral device concurrently with the first application.

The method may also include, in response to a determination that a first throughput or latency of the communication between the first application and the dual-mode peripheral device is greater or smaller than a second throughput or latency of the communication between the second application and the dual-mode peripheral device, selecting the second radio to allow the first application executed by the IHS to communicate with the dual-mode peripheral device, and selecting the first radio to allow a second application executed by the IHS to communicate with the dual-mode peripheral device concurrently with the first application.

In yet another illustrative, non-limiting embodiment, a memory storage device may have program instructions stored thereon that, upon execution by an IHS, cause the IHS to: identify an application or a type of application executed by the IHS; in response to the identification, select a first one of a BT radio or a proprietary RF radio to communicate with a headset, a mouse, a keyboard, or a video game controller; during the communication, determine that at least one of: a distance between the IHS and the headset, mouse, keyboard, or video game controller, a throughput of the communication, a latency of the communication, a signal strength of the communication, an interference in the communication, a battery level of the IHS, or a battery level of the headset, mouse, keyboard, or video game controller is greater or smaller than a threshold value; and in response to the determination, select a second one of the BT radio or proprietary RF radio to communicate with the headset, mouse, keyboard, or video game controller.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

DETAILED DESCRIPTION

Figure 1:
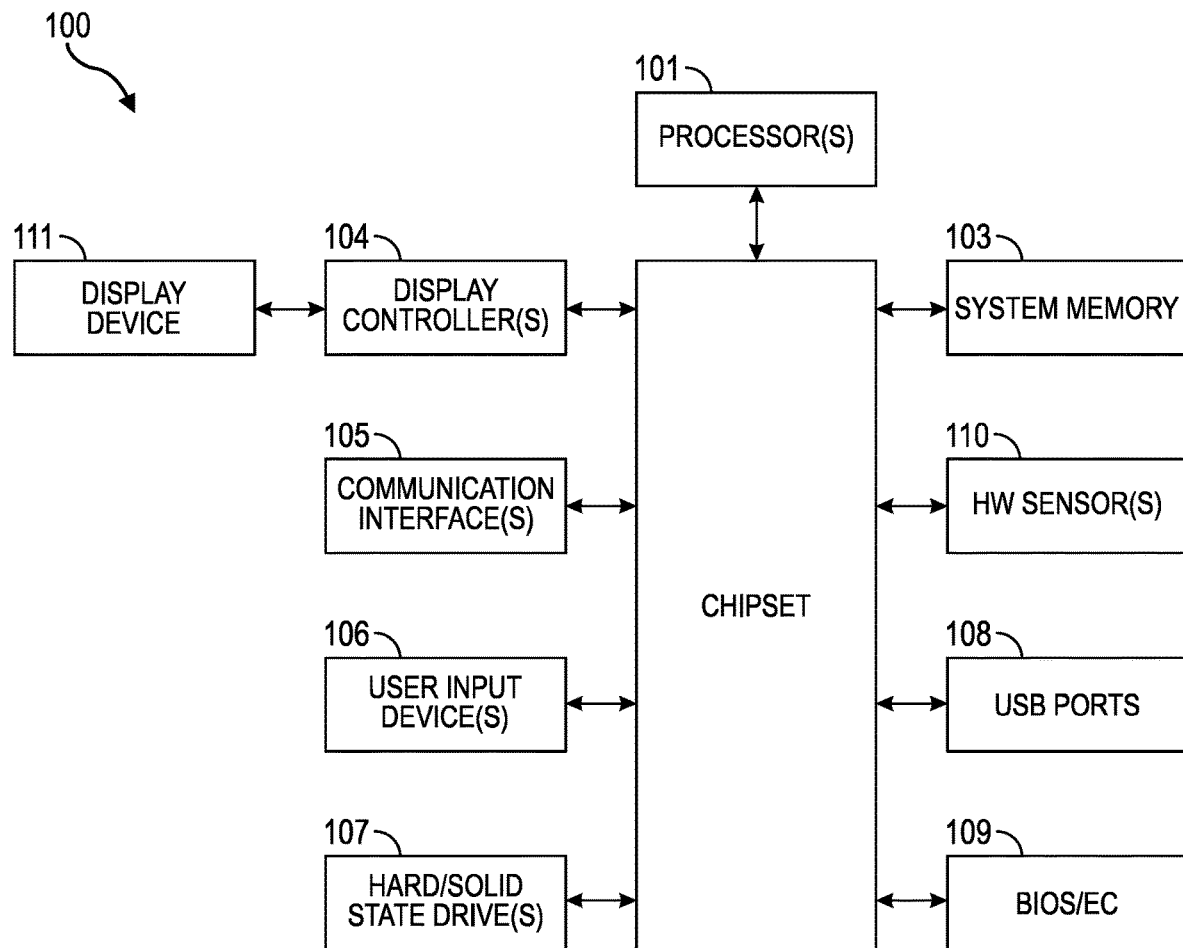
FIG. 1 depicts a block diagram of examples of components of an Information Handling System (IHS), according to some embodiments.

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price.

An IHS may include random access memory (RAM), one or more processing resources such as a central processing unit (CPU) or hardware or software control logic, ROM, and/or other types of nonvolatile memory. Additional components of an IHS may include one or more disk drives, one or more network ports for communicating with external devices as well as various input and output (I/O) devices, such as a keyboard, a mouse, touchscreen and/or a video display. An IHS may also include one or more buses operable to transmit communications between the various hardware components. A more detailed example of an IHS is described with respect to FIG. 1. It should be appreciated that although certain embodiments are discussed in the context of a personal computing device, other embodiments may utilize other types of IHSs.

In various deployments, an IHS may be coupled to one or more peripheral devices that provide the IHS with additional functionality. Examples of peripheral devices include: docking stations, keyboards, mice, touchscreens, touchpads, trackpads, trackballs, pen tablets, joysticks, game controllers, MIDI keyboards, scanners, cameras, microphones, biometric sensors, monitors, displays projectors, TVs, printers, 3D printers, plotters, speakers, external hard drives, media card readers, digital camcorders, digital mixers, musical equipment, etc.

In the case of a wireless peripheral device, a factory or manufacturer of the device may pre-pair the device to a "dongle" (e.g., a wireless communications adapter or radio), a small piece of hardware that plugs into a port of an IHS (e.g., a Universal Serial Bus or "USB" port) and allows its respective peripheral device to connect to the IHS wirelessly, using the dongle's radio interface.

Whether directly or through a dongle, a wireless peripheral device may be coupled to an IHS via a standard communication protocol such as BLUETOOTH OR "BT," BT LOW ENERGY or "BLE," ZIGBEE, Z-WAVE, WI-FI, WI-FI DIRECT, etc. Additionally, or alternatively, a wireless peripheral device may be coupled to the IHS using a proprietary, non-standardized Radio Frequency (RF) protocol (e.g., in the 2.4 GHz band). Proprietary RF communications are faster and have a longer range than BT communications, but consume more power. Conversely, BT is slower and has shorter range than RF, but it is more energy efficient.

When a dual or multi-mode wireless peripheral device is available, a user may have two or more radio interfaces to choose from. In operation, the user may be responsible for manually selecting between different radio interface options (e.g., BT and 2.4 GHz RF), for example, using a physical switch disposed on the dongle or on the device itself.

As the inventors hereof have recognized, however, users of dual or multi-mode wireless peripheral devices often do not change their initial radio interface selections. Also, there is currently no mechanism for automatically switching between different radio interfaces, for instance, to optimize battery life or performance (e.g., throughput, latency, etc.). To address these, and other concerns, systems and methods described herein may configure an IHS to automatically manage its connectivity to a dual or multi-mode wireless peripheral device based, at least in part, upon context.

For example, consider the case of a dual-mode gaming peripheral, such as a mouse, keyboard, or headset, that has both a 2.4 GHz RF and BT radios. In some scenarios, systems and methods described herein may identify when the IHS is executing a video game title and, in response, it may automatically switch the peripheral's communications with the IHS from BT to proprietary 2.4 GHz RF communications (which may include activating or powering a 2.4 GHz RF dongle). When execution of the game is stopped or is placed in the background (e.g., a game window is closed or minimized in a Graphical User Interface or "GUI" of an Operating System or "OS" instantiated by the IHS), these systems and methods may switch the peripheral's communications with the IHS from proprietary 2.4 GHz RF back to BT communications (and deactivate or power down the 2.4 GHz RF dongle).

As another example, when a user is moving out of BT range with respect to their IHS wearing an audio headset while on virtual collaboration session or conference call, systems and methods described herein may automatically switch the headset to its 2.4 GHz RF radio for improved performance (e.g., where the BT signal is weak), without user intervention. Later, when the user moves closer to the IHS and is again within BT range, these systems and methods may switch the headset back to its BT radio, still without the need for user input.

As yet another example, prolonged use of a 2.4 GHz RF radio can drastically reduce the battery life of portable IHSs. Using systems and methods described herein, however, when low battery conditions are detected on either the IHS or a peripheral device, radio communications between the two are automatically switched to BT. If the low battery condition is sufficiently overcome (e.g., the IHS and/or peripheral device is currently charging and/or has reached a minimum charge level), then these systems and methods may automatically switch radio communications between the IHS and the peripheral device back to the 2.4 GHz RF radio.

FIG. 1 is a block diagram of components of IHS 100, according to some embodiments. As depicted, IHS 100 includes processor 101. In various embodiments, IHS 100 may be a single-processor system, or a multi-processor system including two or more processors. Processor 101 may include any processor capable of executing program instructions, such as a PENTIUM series processor, or any general-purpose or embedded processors implementing any of a variety of Instruction Set Architectures (ISAs), such as an x86 ISA or a Reduced Instruction Set Computer (RISC) ISA (e.g., POWERPC, ARM, SPARC, MIPS, etc.).

IHS 100 includes chipset 102 coupled to processor 101. Chipset 102 may provide processor 101 with access to several resources. In some cases, chipset 102 may utilize a QuickPath Interconnect (QPI) bus to communicate with processor 101. Chipset 102 may also be coupled to communication interface(s) 105 to enable communications between IHS 100 and various wired and/or wireless networks, such as Ethernet, WiFi, BT, cellular or mobile networks (e.g., code-division multiple access or "CDMA," time-division multiple access or "TDMA," Long-Term Evolution or "LTE," etc.), satellite networks, or the like. In some cases, interface(s) 105 may be used to communicate with peripheral devices. Moreover, interface(s) 105 may be coupled to chipset 102 via a PCIe bus.

Chipset 102 may be coupled to display controller(s) 104, which may include one or more or graphics processor(s) (GPUs) on a graphics bus, such as an Accelerated Graphics Port (AGP) or Peripheral Component Interconnect Express (PCIe) bus. As shown, display controller(s) 104 provide video or display signals to display device 111. In other implementations, any number of display controllers or display devices may be used.

Display device 111 may include Liquid Crystal Display (LCD), Light Emitting Diode (LED), organic LED (OLED), or other thin film display technologies. Display device 111 may include a plurality of pixels arranged in a matrix, configured to display visual information, such as text, two-dimensional images, video, three-dimensional images, etc. In some cases, display device 111 may be provided as a single continuous display, rather than two discrete displays.

Chipset 102 may provide processor 101 and/or display controller(s) 104 with access to system memory 103. In various embodiments, system memory 103 may be implemented using any suitable memory technology, such as static RAM (SRAM), dynamic RAM (DRAM) or magnetic disks, or any nonvolatile/Flash-type memory, such as a solid-state drive (SSD) or the like. Memory 103 may store program instructions that, upon execution by processor 101, enable a collaboration mode for a touchpad coupled or integrated into IHS 100.

Chipset 102 may also provide access to one or more hard disk and/or solid-state drives 107. In certain embodiments, chipset 102 may also provide access to one or more optical drives or other removable-media drives. In certain embodiments, chipset 102 may also provide access to one or more USB ports 108, to which one or more peripheral devices may be coupled (e.g., wiredly or wirelessly though a dongle).

Chipset 102 may further provide access to one or more user input devices 106, for example, using a super I/O controller or the like. Examples of user input devices 106 include, but are not limited to, a keyboard, mouse, touchpad, stylus or active pen, totem, etc. Each of user input devices 106 may include a respective controller (e.g., a touchpad may have its own touchpad controller) that interfaces with chipset 102 through a wired or wireless connection (e.g., via communication interfaces(s) 105).

In certain embodiments, chipset 102 may also provide an interface for communications with one or more hardware (HW) sensors 110. Sensors 110 may be disposed on or within the chassis of IHS 100, and may include, but are not limited to: electric, magnetic, radio, optical, infrared, thermal, force, pressure, acoustic, ultrasonic, proximity, position, GPS, deformation, bending, direction, movement, velocity, rotation, and/or acceleration sensor(s).

Upon booting of IHS 100, processor(s) 101 may utilize Basic Input/Output System (BIOS) instructions of BIOS/Embedded Controller (EC) 109 to initialize and test hardware components coupled to IHS 100 and to load an OS for use by IHS 100. BIOS 109 provides an abstraction layer that allows the OS to interface with certain hardware components that are utilized by IHS 100. Via the hardware abstraction layer provided by BIOS 109, software stored in system memory 103 and executed by processor 101 can interface with certain I/O devices that are coupled to IHS 100. The Unified Extensible Firmware Interface (UEFI) was designed as a successor to BIOS. As a result, many modern IHSs utilize UEFI in addition to or instead of a BIOS. As used herein, BIOS 109 is intended to also encompass a UEFI component.

EC 109 may be installed as a Trusted Execution Environment (TEE) component to the motherboard of IHS 100. EC 109 may implement operations for interfacing with a power adapter in managing power for IHS 100. Such operations may be utilized to determine the power status of IHS 100, such as whether IHS 100 is operating from battery power or is plugged into an AC power source. Firmware instructions utilized by EC 109 may be used to provide various core operations of IHS 100, such as power management and management of certain modes of IHS 100 (e.g., turbo modes, maximum operating clock frequencies of certain components, etc.).

In some implementations, a low-power mode of operation may include the S0 low-power idle model, also known as Modern Standby or Connected Standby, which provides an instant on/off user experience and maintains a network connection for certain processes while consuming very little power. These power modes may be entered, for example, when IHS 100 transitions into standby (e.g., "sleep," etc.).

EC 109 may also implement operations for detecting certain changes to the physical configuration or posture of IHS 100 and managing the modes of a touchpad or other user input device 106 in different configurations of IHS 100.

For instance, where IHS 100 as a 2-in-1 laptop/tablet form factor, EC 109 may receive inputs from a lid position or hinge angle sensor 110, and it may use those inputs to determine: whether the two sides of IHS 100 have been latched together to a closed position or a tablet position, the magnitude of a hinge or lid angle, etc.

EC 109 may be further configured to calculate hashes or signatures that uniquely identify individual components of IHS 100. In such scenarios, EC 109 may calculate a hash value based on the configuration of a hardware and/or software component coupled to IHS 100. For instance, EC 109 may calculate a hash value based on all firmware and other code or settings stored in an onboard memory of a hardware component. Such hash values may be calculated as part of a trusted process of manufacturing IHS 100 and may be maintained in secure storage as a reference signature. EC 109 may later recalculate the hash value for a component may compare it against the reference hash value to determine if any modifications have been made to the component, thus indicating that the component has been compromised. In this manner, EC 109 may validate the integrity of hardware and software components installed on IHS 100.

In some embodiments, IHS 100 may not include all the components shown in FIG. 1. In other embodiments, IHS 100 may include other components in addition to those that are shown in FIG. 1. Furthermore, some components that are represented as separate components in FIG. 1 may instead be integrated with other components. For example, all or a portion of the operations executed by the illustrated components may instead be executed by components integrated into processor(s) 101 as systems-on-a-chip (SoC). As such, in various embodiments, IHS 100 may be implemented as different classes of computing devices including, but not limited to: servers, workstations, desktops, laptops, appliances, video game consoles, tablets, smartphones, etc.

Figure 2:
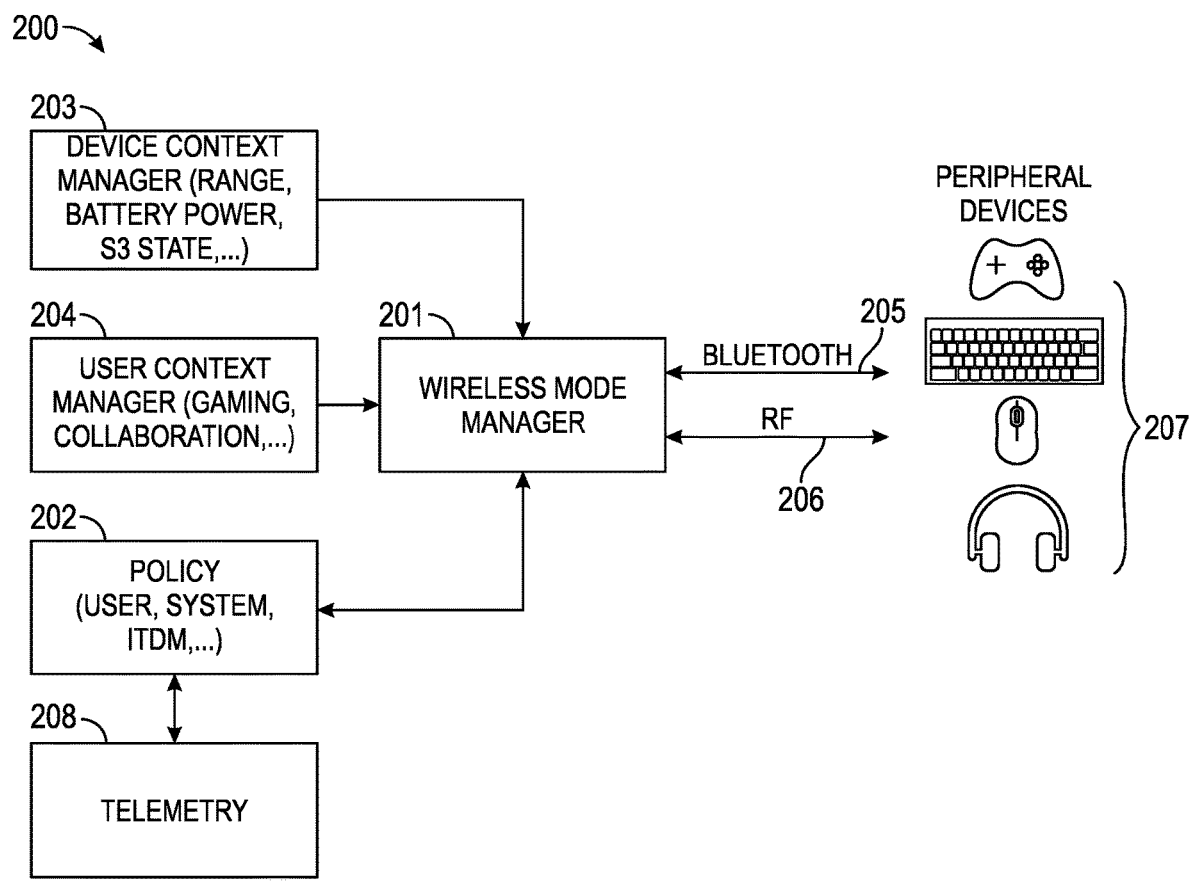
FIG. 2 depicts a block diagram of an example of a system for managing peripheral device connectivity based on context, according to some embodiments.

FIG. 2 depicts a block diagram of an example of system 200 for peripheral device connectivity management based on context. In some embodiments, one or more components of system 200 may be instantiated, at least in part, through the execution by a processor (e.g., processor(s) 101) of program instructions stored in a memory device (e.g., system memory 103) of one or more IHSs (e.g., IHS 100).

System 200 includes wireless mode manager 201 coupled to policy module 202, device context manager 203, and user context manager 204. In operation, wireless mode manager 201 is configured to select between radio interfaces 205 (e.g., BT) and 206 (e.g., proprietary RF) for communications between IHS 100 and peripheral device(s) 207 based, at least in part, upon a policy received from policy module 202 and/or inputs received from device context manager 203 and user context manager 204. In some cases, to make its automatic radio interface selections, wireless mode manager 201 may implement a Machine Learning (ML) or Artificial Intelligence (AI) model.

In various embodiments, in order to automatically switch between multiple wireless radio interfaces, wireless mode manager 201 may execute ML/AI models, engines, or workloads including, but not limited to: regression workloads (e.g., Ordinary Least Squares Regression (OLSR), Linear Regression, Logistic Regression, Stepwise Regression, Multivariate Adaptive Regression Splines (MARS), Locally Estimated Scatterplot Smoothing (LOESS), etc.), instance-based workloads (e.g., k-Nearest Neighbor (kNN), Learning Vector Quantization (LVQ), Self-Organizing Map (SOM), Locally Weighted Learning (LWL), Support Vector Machines (SVM), etc.), regularization workloads (e.g., Ridge Regression, Least Absolute Shrinkage and Selection Operator (LASSO), Elastic Net, Least-Angle Regression (LARS), etc.), decision tree workloads (e.g., Classification and Regression Tree (CART), Iterative Dichotomizer 3 (ID3), C4.5 and C5.0, Chi-squared Automatic Interaction Detection (CHAID), Decision Stump, M5, Conditional Decision Trees, etc.), Bayesian workloads (e.g., Naive Bayes, Gaussian Naive Bayes, Multinomial Naive Bayes, Averaged One-Dependence Estimators (AODE), Bayesian Belief Network (BBN), Bayesian Network (BN), etc.), clustering workloads (e.g., k-Means, k-Medians, Expectation Maximization (EM), Hierarchical Clustering, Association Rule Learning Algorithms, etc.), association rule learning workloads (e.g., Apriori algorithm, Eclat algorithm, etc.), artificial neural network workloads (e.g., Perceptron, Multilayer Perceptrons (MLP), Back-Propagation, Stochastic Gradient Descent, Hopfield Network Radial Basis Function Network (RBFN), etc.), deep learning workloads (e.g., Convolutional Neural Network (CNN), Recurrent Neural Networks (RNNs), Long Short-Term Memory Networks (LSTMs), Stacked Auto-Encoders, Deep Boltzmann Machine (DBM), Deep Belief Networks (DBN), etc.), dimensionality reduction workloads (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA), etc.), ensemble workloads (e.g., Boosting, Bootstrapped Aggregation (Bagging), AdaBoost, Weighted Average (Blending), Stacked Generalization (Stacking), Gradient Boosting Machines (GBM), Gradient Boosted Regression Trees (GBRT), Random Forest, etc.), etc.

Device context manager 203 may be configured to aggregate information from various sources which can be input to the ML/AI model of wireless mode manager 201 for wireless connectivity management. Device context information may be extracted using filter drivers, APIs, OS, or EC telemetry, and/or telemetry aggregation engine (e.g., the DELL TELEMETRY PLATFORM or "DTP" for battery and power state telemetry).

Examples of operations performable by device context manager 203 may include, but are not limited to: using an OS API to detect when an RF dongle is connected to IHS 100, using an OS API to detect the IHS's power mode or power state, using a wireless filter driver to detect wireless interference information, using network optimization software to detect wireless signal quality for BT and RF interfaces, etc.

User context manager 204 may include callout driver(s) configured to detect active applications, user preferences, ITDM configurations, etc. In some cases, an ML/AI engine may also be used to identify multiple application contexts for wireless configuration management.

Examples of operations performable by user context manager 204 may include, but are not limited to: identifying a gaming context when a gaming application is in progress (or in the foreground) or is a most active application, identifying a collaboration context when a real-time collaboration application is in progress (or in the foreground) or is a most active application, identifying a streaming context when a streaming application is in progress (or in the foreground) or is a most active application (e.g., with a wireless stream to a wireless headset), and so on.

Wireless mode manager 201 uses the device and user context information to manage connectivity modes. Examples of operations performable by wireless mode manager 201 may include, but are not limited to: auto-switching between BT mode 205 and RF mode 206 based upon device and user context information using the ML/AI engine, recommending a manual configuration for connectivity modes to the user, applying or enforcing a user-defined policy for selected applications, configuring communications based on power savings versus performance policy configurations, dynamically controlling the power of BT radio 205 and/or RF radio 206, for example, depending upon their respective signal quality, facilitating concurrent, multimode operation across different peripherals and applications (e.g., using RF 206 for a gaming controller and BT for an audio device), etc.

As such, wireless mode manager 201 may be configured to contextually manage various connectivity options, such as BT and RF mode for peripheral devices for improved performed and user experience. Furthermore, wireless mode manager 201 may provide intelligence for multiple connectivity options to be leveraged based on the device and user needs.

Telemetry engine 208 is coupled to policy module 202 and it may be configured to track and learn consumer usage profiles to update user, IHS, and/or Information Technology Decision Maker (ITDM) policies maintained by policy module 202.

In operation, telemetry engine 208 may be configured to perform self-learning and/or policy modifications. For example, if a peripheral device does not transition to BT mode when the IHS or peripheral is out of range or in a low power state, the user may manually switch radio interfaces ("manual override"). Over time, telemetry engine 208 may learn the user's behavior and adjust the policy (e.g., increase or decrease one or more range or battery threshold values) according to their preferences or needs. In some cases, predictive switching may also be enabled in anticipation of signal strength falling below a selected threshold based, at least in part, upon recorded historical events.

Although two radio interfaces BT 205 and proprietary RF 206 are specifically illustrated in system 200, in other implementations, other radio interfaces may be available (e.g., BT and BLE). Moreover, in some cases, three or more radios and/or wireless communication interfaces may be available. Also, in other embodiments, one or more of these operations may be integrated in a dongle or stand-alone SoC with vendor-defined USB control to send device context to the dongle to enable optimized multi-mode operation.

Figure 3:
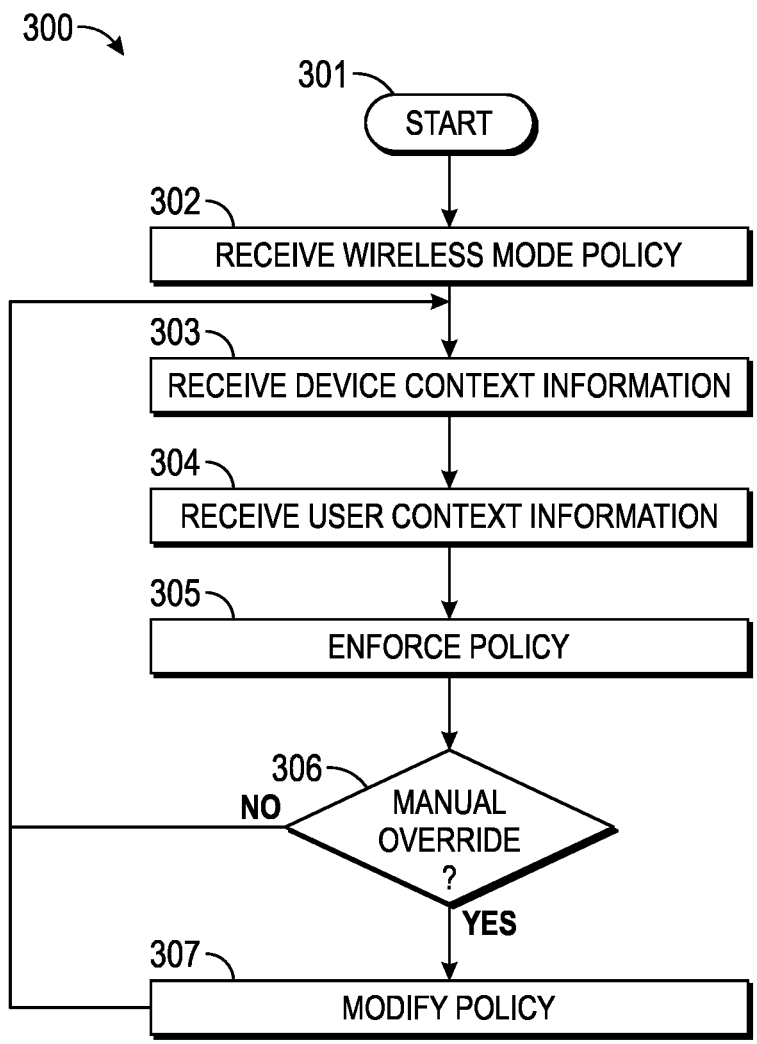
FIG. 3 depicts a flowchart of an example of a method for managing peripheral device connectivity based on context, according to some embodiments.

FIG. 3 depicts flowchart 300 of an example of a method for peripheral device connectivity management based on context. In various embodiments, operations of flowchart 300 may be performed, at least in part, by one or more components 200 shown in FIG. 2. Particularly, method 300 starts at 301, for example, upon booting of an OS and/or when a peripheral device is detected. Additionally, or alternatively, method 300 may start in response to a determination that a selected application (e.g., a specific video game title) or type of application (e.g., online gaming) is (or is not) being executed, being executed in the foreground, and/or determined to be a most active application among a plurality of others executed by the IHS.

At 302, method 300 includes receiving a wireless mode policy (e.g., from policy module 202). The wireless mode policy may include a file containing a set of one or more wireless peripheral connection management rules or preferences applicable to a particular user ID, IHS ID, serial number, or service tag, ITDM, etc. For example, the wireless mode policy may include one or more range and battery level threshold values against which subsequent radio switching decisions can be made by wireless mode manager 201.

At 303, method 300 includes receiving device context information (e.g., a range, a battery level or status, a power state, an IHS posture, an IHS location, a signal strength, a signal-to-noise ratio, an interference metric, etc.) from device context manager 203. At 304, method 300 includes receiving user context information (e.g., a list of applications in execution, whether an application is in the foreground or background, a type of application, a most active application among a plurality of other applications, etc.) from device context manager 204.

At 305, method 300 may include enforcing the policy based, at least in part, upon the information received in operations 303 and/or 304. For example, to enforce the policy, method 300 may automatically switch or select a particular radio interface (e.g., BT vs. proprietary RF) available for communications between the IHS and a selected peripheral device or type of device depending upon the contextual information of 303 and/or 304. To determine whether to switch or select a radio interface, method 300 may use one or more ML/AI models. Such ML/AI models may be configured, for example, to predict that at least one of: a distance between the IHS and the peripheral device, a battery level of the IHS, or a battery level of the peripheral device is expected to be greater or smaller than a threshold value outlined in the policy.

In some cases, to enforce the policy, method 300 may select a first radio to allow a first application to communicate with a peripheral device, and a second radio to allow a second application to communicate with the same peripheral device concurrently with the first application. In other cases, a single application may use both radio interfaces to communicate with a same peripheral device (e.g., BT for control messages and RF for audio or video payloads). In yet other cases, a single application may use a first radio to communicate with a first peripheral device and a second radio to communicate with a second peripheral device, and both radio interfaces are managed using method 300.

It should be noted that, at 305, method 300 may apply some amount of hysteresis or time delay before each radio interface selection to avoid switching rapidly when context changes are fast and overburden the IHS.

At 306, method 300 may determine whether the user has manually overridden the automatic selection of block 305. If not, control returns to 303 for a continuous, periodic, or event-triggered re-evaluation of the context against the policy. Otherwise, at 307, metrics are collected and used to modify the wireless mode policy originally received at 303 to match the user's predicted needs or expectations in future sessions.

For example, as result of 307, the wireless peripheral connection management rules or preferences of the wireless mode policy may be changed to increase or decrease a range threshold or a battery level threshold for a particular peripheral device. If the manual override occurs when a certain application or type of application is executing (or when the application is the most active application), the IHS is in a certain location (e.g., home office vs. work office), and/or during a particular time of day (e.g., either during or after business hours), that context may be incorporated into the modified wireless mode policy, for example, by setting overriding range or battery level thresholds that are specific to that context.

As such, systems and methods described herein may provide the ability to model, learn, and manage multiple peripheral connectivity links for optimized performance of an IHS and its peripheral devices. These systems and methods may enable the concurrent use of multiple connectivity options for peripheral connectivity, thus providing faster connectivity and operation. These systems and methods may also allow for low power operation of peripheral devices using BT while higher power RF connectivity is available and include self-learning features that further enhance the operation of wireless mode manager 201 over time.

In many implementations, systems and methods described herein may be incorporated into a wide range of electronic devices including, for example, computer systems or Information Technology (IT) products such as servers, desktops, laptops, memories, switches, routers, etc.; telecommunications hardware; consumer devices or appliances such as mobile phones, tablets, wearable devices, IoT devices, television sets, cameras, sound systems, etc.; scientific instrumentation; industrial robotics; medical or laboratory electronics such as imaging, diagnostic, or therapeutic equipment, etc.; transportation vehicles such as automobiles, buses, trucks, trains, watercraft, aircraft, etc.; military equipment, etc. More generally, these systems and methods may be incorporated into any device or system having one or more electronic parts or components.

To implement various operations described herein, computer program code (i.e., program instructions for carrying out these operations) may be written in any combination of one or more programming languages, including an object-oriented programming language such as Java, Smalltalk, Python, C++, or the like, conventional procedural programming languages, such as the "C" programming language or similar programming languages, or any of machine learning software. These program instructions may also be stored in a computer readable storage medium that can direct a computer system, other programmable data processing apparatus, controller, or other device to operate in a particular manner, such that the instructions stored in the computer readable medium produce an article of manufacture including instructions which implement the operations specified in the block diagram block or blocks. The program instructions may also be loaded onto a computer, other programmable data processing apparatus, controller, or other device to cause a series of operations to be performed on the computer, or other programmable apparatus or devices, to produce a computer implemented process such that the instructions upon execution provide processes for implementing the operations specified in the block diagram block or blocks.

Modules implemented in software for execution by various types of processors may, for instance, include one or more physical or logical blocks of computer instructions, which may, for instance, be organized as an object or procedure. Nevertheless, the executables of an identified module need not be physically located together but may include disparate instructions stored in different locations which, when joined logically together, include the module and achieve the stated purpose for the module. Indeed, a module of executable code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices.

Reference is made herein to "configuring" a device or a device "configured to" perform some operation(s). It should be understood that this may include selecting predefined logic blocks and logically associating them. It may also include programming computer software-based logic of a retrofit control device, wiring discrete hardware components, or a combination of thereof. Such configured devices are physically designed to perform the specified operation(s).

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

The invention claimed is:
1. An Information Handling System (IHS), comprising:
a processor; and
a memory coupled to the processor, the memory having program instructions stored thereon that, upon execution, cause the IHS to:
 identify a gaming application executed by the IHS;
 in response to the identification, select a first one of a BLUETOOTH (BT) radio or a proprietary radio frequency (RF) radio to communicate with a peripheral device;
 communicate with the peripheral device via the selected radio;

during the communication, determine that at least one of: a battery level of the IHS, or a battery level of the peripheral device is greater or smaller than a threshold value; and in response to the determination, communicate control messages of the gaming application using the first one of the BT or proprietary RF radios and communicate audio or video payloads of the gaming application using a second one of the BT or proprietary RF radios.

2. The IHS of claim 1, wherein the IHS comprises a laptop computer, a desktop computer, a tablet, or a smart phone, and wherein the peripheral device comprises a headset, a mouse, a keyboard, or a video game controller.

3. The IHS of claim 1, wherein the BLUETOOTH (BT) radio comprises a BT Low Energy (BLE) radio.

4. The IHS of claim 1, wherein the program instructions, upon execution, further cause the IHS to determine that a distance between the IHS and the peripheral device is greater than another threshold value.

5. The IHS of claim 1, wherein the program instructions, upon execution, further cause the IHS to determine a distance between the IHS and the peripheral device is smaller than another threshold value.

6. The IHS of claim 1, wherein the program instructions, upon execution, further cause the IHS to determine that at least one of: the battery level of the IHS, or the battery level of the peripheral device is greater than the threshold value.

7. The IHS of claim 1, wherein the program instructions, upon execution, further cause the IHS to determine that at least one of: the battery level of the IHS, or the battery level of the peripheral device is smaller than the threshold value.

8. The IHS of claim 1, wherein the program instructions, upon execution, cause the IHS to verify, prior to selecting the first one of the BT or proprietary RF radios, that a selected application or type of application is being executed by the IHS.

9. The IHS of claim 8, wherein the type of application comprises a gaming, collaboration, video conferencing, audio conferencing, or streaming application.

10. The IHS of claim 8, wherein to verify that the selected application is being executed by the IHS, the program instructions, upon execution, cause the IHS to verify that the selected application is the most active application among a plurality of applications in execution.

11. The IHS of claim 8, wherein to verify that the selected application is being executed by the IHS, the program instructions, upon execution, cause the IHS to verify that the selected application is being executed in a foreground.

12. The IHS of claim 8, wherein the program instructions, upon execution, further cause the IHS to select the first one of the BT or proprietary RF radios in response to a subsequent determination that the selected application is being executed in a background.

13. The IHS of claim 1, wherein the program instructions, upon execution, cause the IHS to verify, prior to selecting the first one of the BT or proprietary RF radios, that a selected application or type of application is not being executed by the IHS.

14. The IHS of claim 1, wherein to determine that at least one of: the battery level of the IHS, or the battery level of the peripheral device is greater or smaller than the threshold value, the program instructions, upon execution, cause the IHS to predict that the at least one of: the battery level of the IHS, or the battery level of the peripheral device is expected to be greater or smaller than the threshold value.

15. The IHS of claim 1, wherein the program instructions, upon execution, cause the IHS to, in response to a manual override, select the first one of the BT or proprietary RF radios.

16. A method comprising:
identifying a gaming application executed by an Information Handling System (IHS);

in response to the identification, selecting a first one of a BLUETOOTH (BT) radio or a proprietary radio frequency (RF) radio to communicate with a peripheral device;

communicating with the peripheral device via the selected radio;

during the communication, determining that at least one of: a battery level of the IHS, or a battery level of the peripheral device is greater or smaller than a threshold value; and in response to the determination, communicating control messages of the gaming application using the first one of the BT or proprietary RF radios and communicating audio or video payloads of the gaming application using a second one of the BT or proprietary RF radios.

17. The method of claim 16, further comprising determining, during the communication, that a throughput or latency of the communication between the gaming application and the peripheral device is greater or smaller than another threshold value.

18. A memory storage device having program instructions stored thereon that, upon execution by an Information Handling System (IHS), cause the IHS to:

identify a gaming application executed by the IHS;

in response to the identification, select a first one of a BLUETOOTH (BT) radio or a proprietary radio frequency (RF) radio to communicate with a peripheral device;

communicate with the peripheral device via the selected radio;

during the communication, determine that at least one of: a battery level of the IHS, or a battery level of the peripheral device is greater or smaller than a threshold value; and in response to the determination, communicate control messages of the gaming application using the first one of the BT or proprietary RF radios and communicate audio or video payloads of the gaming application using a second one of the BT or proprietary RF radios.

19. The memory storage device of claim 18, wherein the program instructions, upon execution, cause the IHS to determine, during the communication, that a throughput or latency of the communication between the gaming application and the peripheral device is greater or smaller than another threshold value.

\* \* \* \* \*